March 31, 1925.  
W. H. KUSHERA  
WEED DESTROYER  
Filed Aug. 3, 1922  
1,531,957
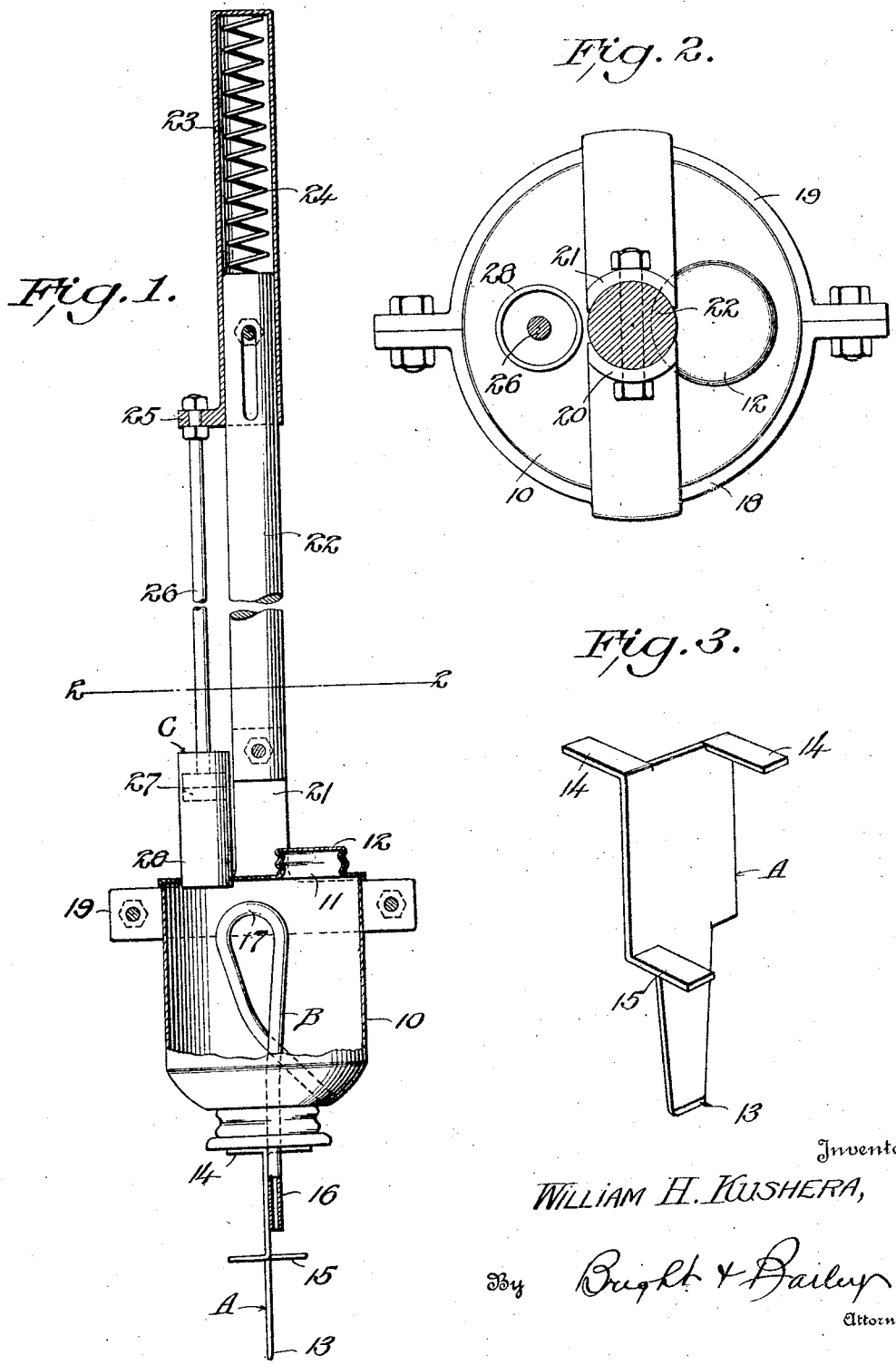

Patented Mar. 31, 1925.

1,531,957

UNITED STATES PATENT OFFICE.

WILLIAM H. KUSHERA, OF TOPEKA, KANSAS.

WEED DESTROYER.

Application filed August 3, 1922. Serial No. 579,521.

*To all whom it may concern:*

Be it known that I, WILLIAM H. KUSHERA, a citizen of the United States, and resident of Topeka, in the county of Shawnee and State of Kansas, have invented certain new and useful Improvements in Weed Destroyers, of which the following is a specification.

My invention relates to weed destroyers and particularly to that class of devices which are utilized for destroying dandelions and thistles by injecting into the plant a suitable killing liquid such as Paris green.

In the use of devices of this character considerable difficulty has always been experienced in controlling the delivery of the killing liquid from the reservoir or container for the reason that there is a tendency for the liquid to drip from the container when not being positively forced therefrom and such drippings, as the operator moves about over a lawn or the like, result in injury to the grass which it is desired to maintain in a proper state of cultivation.

It is therefore the purpose of my present invention to provide a device of this character embodying an improved construction whereby the possibility of the liquid dripping from the reservoir or container of the device as it is transported from one place to the other is entirely eliminated.

In addition, it is my purpose to provide a device of this character embodying in addition an improved form of plant penetrating knife element and an improved construction generally whereby the use of the device is facilitated and particularly the insertion of the knife element into the plant and the delivery of the killing liquid subsequently to the knife element from the reservoir or container.

It is my further purpose to provide a device of this character which will be simple, light and sturdy in construction and which can be manufactured at a relatively small cost.

I will describe my invention in the best form known to me at present, but it will be apparent that the same is susceptible to changes in forms and proportions and to desirable additions with the exercise of only ordinary mechanical skill and without departing from the scope of the appended claims.

In the drawings chosen to illustrate my invention

Figure 1 is a view of my invention partly in elevation and partly in section;

Figure 2, a section on the line 2—2 of Figure 1; and

Figure 3, a detail perspective view of the plant penetrating knife element.

Referring to the drawings my invention is shown as comprising a container or reservoir 10 having its upper end provided with a filling opening 11 adapted to be closed by a cap 12. Secured to the lower end of the container 10 in axial alinement with the latter is a plant penetrating knife element A whose outer end is somewhat pointed as at 13 and its inner end provided with opposite lateral extensions 14 through the instrumentality of which latter the knife element is secured to the lower end of said container. In order to limit the penetration of the knife element A into the plants I provide said element intermediate its ends with suitable lateral extensions 15. In order to effect delivery of liquid from the container 10 to the blade A I employ a tube B whose delivery end is extended through the lower end of the container as at 16 and this extended portion of the tube lies against the adjacent face of the blade A so that liquid discharging therefrom will run down the blade and enter the plant under the influence of gravity. In order to prevent dripping of liquid from the container when the device is not positively operated for that purpose I bend that portion of the tube within the container upon itself in the form of a loop 17 and thereby dispose the intake end of the tube at the lower end of the container 10. By this construction it will be obvious that when the action of positively forcing the liquid from the container 10 ceases, a section of the tube will drain to the knife element A and when this section of the tube is thus drained, it will be impossible for any additional liquid to drip from the container to the knife element during transportation of the device from one point to another.

My device further embodies opposed semi-circular members 18 and 19 which are clamped around the container at the upper end of the latter. These members 18 and 19 are provided with upwardly extending formations 20 and 21, respectively, which constitute a socket for the reception of a handle 22. Slidably engaged on the outer end of the handle 22 is a grip member 23 having pin and slot connection with said handle to limit its reciprocation as will be obvious. The outer end of this grip member 23 is closed and a spring 24 is interposed between said outer end and the outer end of the handle 22 and serves to normally hold said grip member at the limit of its movement in one direction with respect to the handle. This grip member 23 is provided at its inner end with a lateral extension 25 which has secured thereto one end of a rod 26 and said rod carries on its other end a suitable pump piston 27 operating in a cylinder 28 of an air pressure pump device C. This cylinder 28 is carried by the upper end of the container 10 and the pump device C is operatively associated with the interior of said container, so that when the piston 27 is forced in the direction of the container the pressure of the air within the container will be raised to force the liquid therein through the tube B for the purpose previously referred to.

In the use of my device the handle is first gripped and the knife element A is forced down into the plant that it is desired to destroy. When this condition is established it is only necessary to press downwardly upon the grip extension 23 which will operate the pump device C to eject or deliver a predetermined quantity of liquid from the container 10 to the knife element A and over which latter it will descend under the influence of gravity until it is entirely deposited within the penetrated plant.

With respect to the means to prevent dripping of liquid from the container when the device is not positively operated for that purpose, it will be observed that when pressure is released from the grip 23, the plunger 27 is drawn upward in cylinder 28 which results in a reduction of air pressure in the container 10, thus causing the outside air to rush in through the end 16 of tube B, thereby causing a suction which draws all of the liquid out of the tube back into the container where it is retained and prevented from dripping by the aforementioned loop 17 when carrying the device from one plant to another.

I claim:—

1. An implement of the class described comprising a liquid container having an outlet in one end, a handle extending from the other end of the container, a plant penetrating knife extending from the outlet end of the container in position to receive the contents of the container discharged through said outlet, and an air pressure pump device mounted on the container and handle for forcing the contents of the container through said outlet, said device being operable by the force applied to the handle to penetrate the knife element into a plant.

2. An implement of the class described comprising a liquid container having an outlet in one end, a handle extending from the other end of the container coaxial with the latter, a plant penetrating knife extending from the outlet end of the container substantially in longitudinal alinement with the handle and in position to receive the contents of the container discharged through said outlet, and an air pressure pump device mounted on the container and handle for forcing the contents of the container through said outlet, said device being operable by the force applied to the handle to penetrate the knife element into a plant.

3. An implement of the class described comprising a liquid container provided with a handle, a plant penetrating knife element carried by the container, an outlet member for the container positioned to deliver liquid to the knife element, a grip member slidably engaged with the handle, and means exteriorly operated by movement of the grip member in one direction relative to the handle to positively force liquid from the container through said outlet.

4. An implement of the class described comprising a liquid container provided with a handle, a plant penetrating knife element carried by the container, an outlet member for the container positioned to deliver liquid to the knife element, a grip member telescopically slidable over the handle, means for limiting the relative movements of the handle and grip member, a spring within the grip member reacting from the outer end of the handle to normally hold the grip member at the limit of its movement in one direction on the handle, and means operated by movement in the opposite direction to force liquid from the container through said outlet.

In testimony whereof I hereunto affix my signature.

WILLIAM H. KUSHERA.